July 14, 1936.  H. S. PIERCE  2,047,833
POWER TRANSMISSION CHAIN
Filed Oct. 10, 1934   3 Sheets-Sheet 1
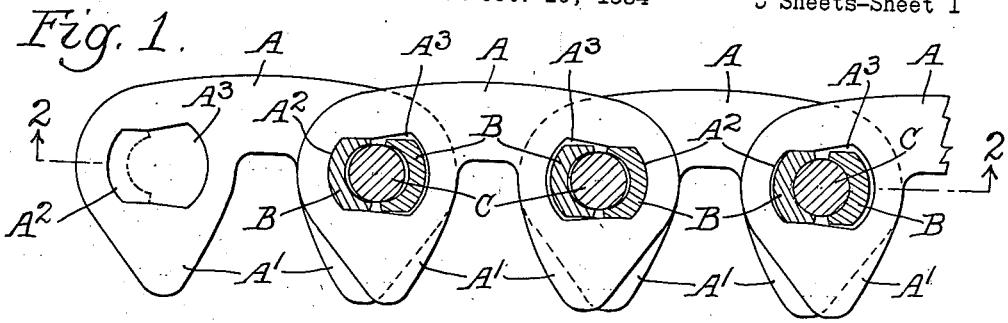
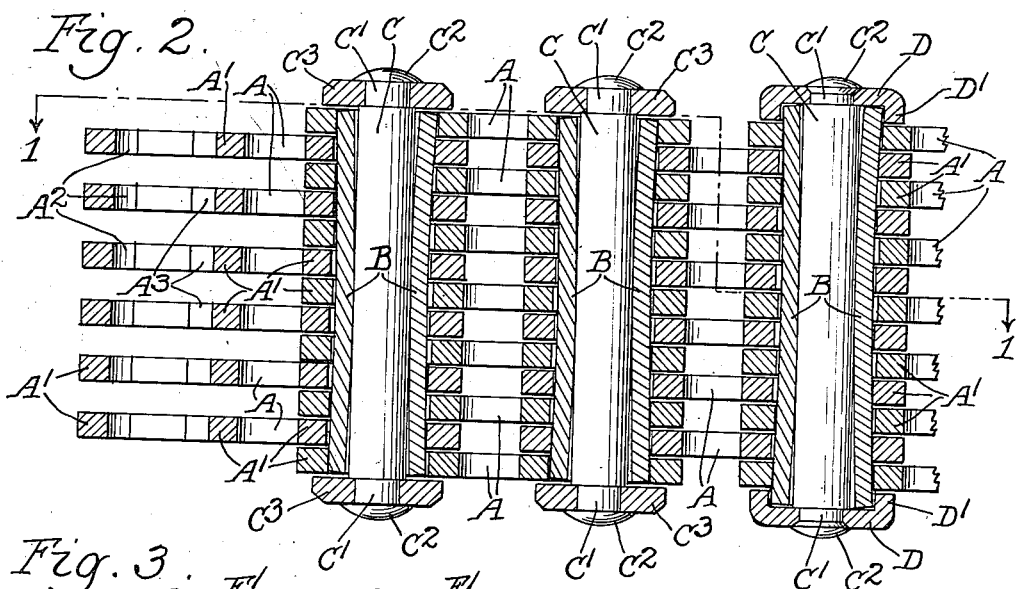
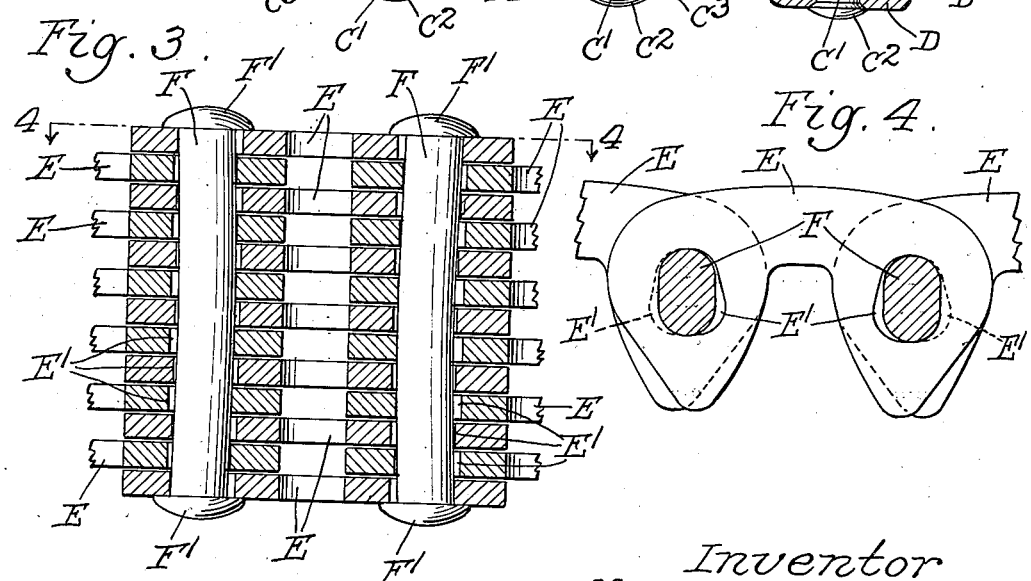
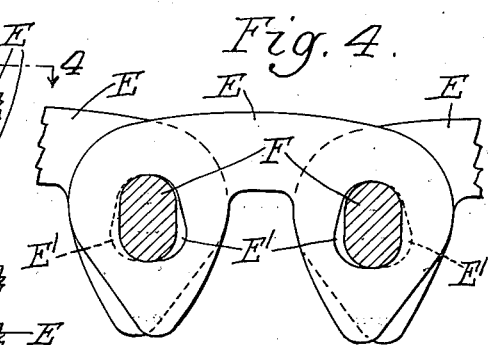
Inventor
Harold S. Pierce
by Parker & Carter
Attorneys.

July 14, 1936.  H. S. PIERCE  2,047,833
POWER TRANSMISSION CHAIN
Filed Oct. 10, 1934   3 Sheets-Sheet 2

Inventor
Harold S. Pierce
by Parker + Carter.
Attorneys.

July 14, 1936.  H. S. PIERCE  2,047,833
POWER TRANSMISSION CHAIN
Filed Oct. 10, 1934  3 Sheets-Sheet 3
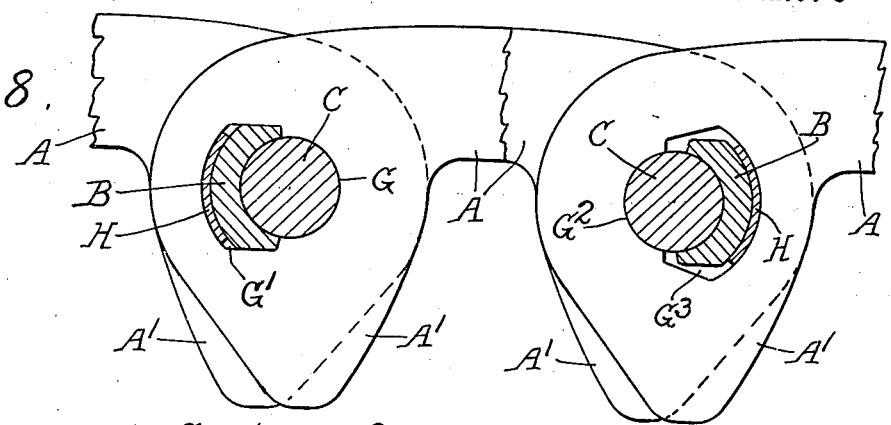
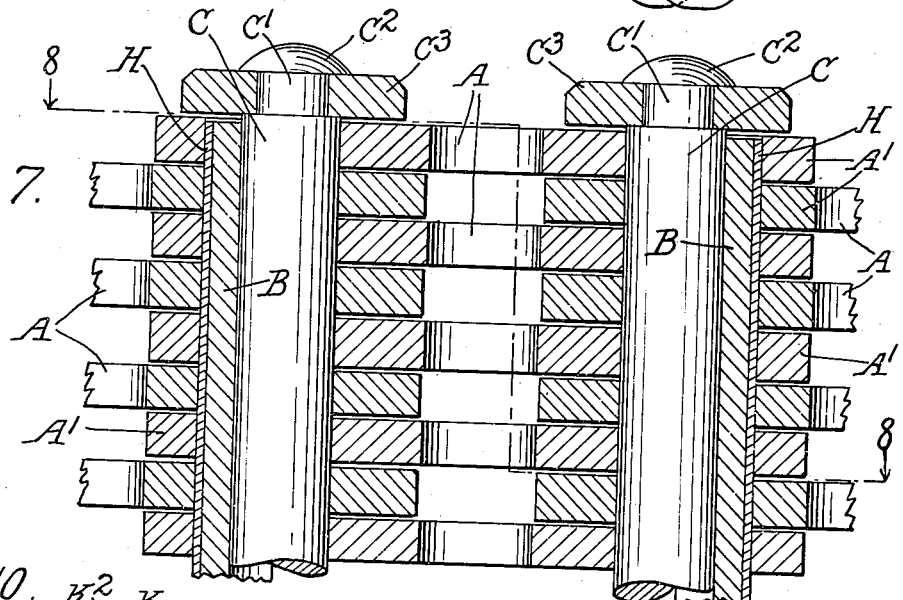
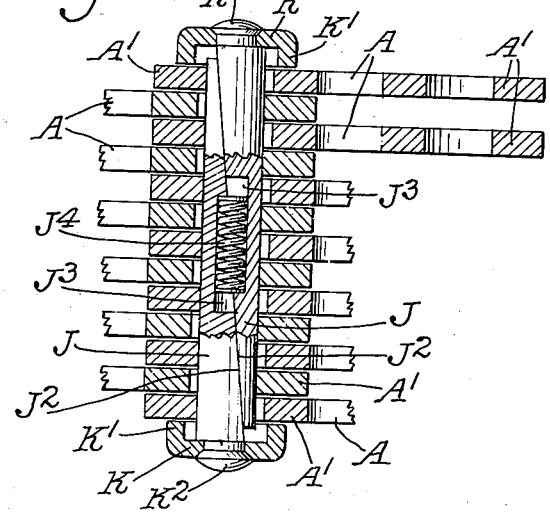
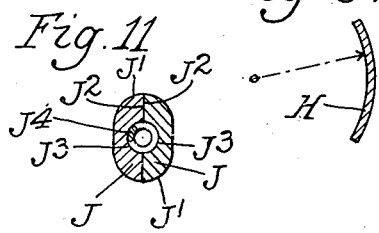
Inventor
Harold S. Pierce
by Parker & Carter.
Attorneys Patented July 14, 1936

2,047,833

UNITED STATES PATENT OFFICE 2,047,833

POWER TRANSMISSION CHAIN

Harold S. Pierce, Indianapolis, Ind., assignor to Link-Belt Company, Chicago, Ill., a corporation of Illinois Application October 10, 1934, Serial No. 747,660

7 Claims. (Cl. 74—251)

This invention relates to chains and in one form it may be embodied in what are called "silent" chains.

It has for one object to provide means for equalizing load or counteracting the effect of unequal pressure upon different parts of the chain link. Such chains are commonly used to drive sprockets and unless the sprockets are in absolute alignment the contact of the chain with the sprocket will be such as to cause uneven wear, because if the out-of-alignment condition of the sprockets remains constant, the chain in going into the sprocket will always strike on one edge first and this and other types of uneven wear and uneven contact may occur. It is one object of the present invention to nullify or compensate for the effect of this uneven contact and uneven wear and to prevent excessive wear on the chain links.

Another important object of the invention is to provide a jointed chain, in the joint of which details of construction are provided which will compensate for the elongation of the chain due to wear, which is inevitable in the functioning of the joints, and in that manner, as far as possible, will serve to reduce or eliminate slack in the chain.

Another object is to prevent jamming or wedging of the chain links as the result of any of the influences mentioned.

Other objects will appear from time to time in the specification and claims.

The invention is illustrated more or less diagrammatically in the accompanying drawings, wherein:—

Figure 1 is a longitudinal section with parts in elevation, taken at line 1—1 of Figure 2;

Figure 2 is a horizontal longitudinal section, taken at line 2—2 of Figure 1;

Figure 3 is a sectional detail, generally similar to a portion of Figure 2, and showing a modified form;

Figure 4 is a section taken at line 4—4 of Figure 3;

Figure 7 is a view generally similar to Figure 5, showing a further modification in which there is an added spring liner;

Figure 8 is a longitudinal vertical section, taken at line 8—8 of Figure 7;

Figure 9 is a detailed sectional view showing the spring liner before it is assembled into the chain;

Figure 10 is a detail showing a further modification in which the pin is split and a spring is provided to draw the split pin sections together.

Figure 11 is a section at line 11—11 of Figure 10.

Like parts are designated by like characters throughout the specification and drawings.

Figure 6:
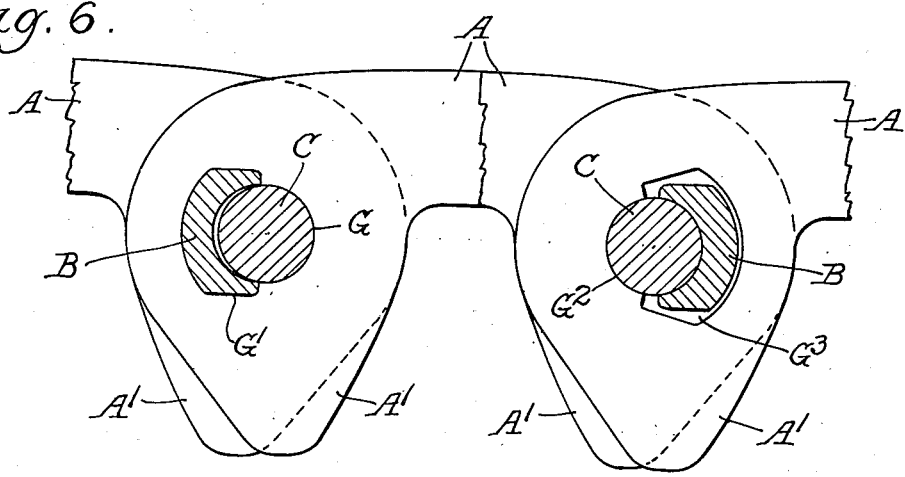
Figure 6 is a vertical longitudinal section taken at line 6—6 of Figure 5.

A, A are links. Each link is formed with a downwardly depending tooth portion $A^1$. A plurality of these links are assembled to form the chain, several links being assembled side by side to form in effect a composite link and being interleaved with an adjacent set which form the adjacent composite or multiple link. Each of the links is provided with two perforations, that portion $A^2$ of each perforation which extends toward the end of the link is relatively small and that portion $A^3$ of each perforation which extends toward the center of the link is relatively large. When the link members are assembled to form the composite or multiple link, a plurality of them are placed side by side and two liners are inserted in each perforation. One is positioned in the portion $A^2$ and held against movement. The other lies in the portion $A^3$ and is free for limited movement.

In each of the perforations $A^2$, $A^3$ there is placed a spring liner B, B. The liners are of partially cylindrical shape and each is provided on its interior with a rounded portion which approximates a portion of a cylinder. As shown particularly in Figure 1, liners B, B are gripped in each of the perforation portions $A^2$ and similar liners are free for slight movement in each of the perforation portions $A^3$. They are, however, gripped against movement with respect to the interleaving link portions which form the adjacent composite or multiple link. Thus each of the liner members is gripped and held against movement with respect to one set of link members and is free for limited movement with respect to the interleaving set of link members.

As shown particularly in Figure 2, the liners are bowed or curved so that together pairs of liners form outwardly flared cavities within which the pins C are mounted. The pins act as pintle pins for the chain links, each of the pins may have a reduced portion $C^1$ at each end which is riveted over as at $C^2$ to hold in place a flat washer $C^3$.

A modified form is shown at the right hand of Figure 2. As shown there instead of the flat washer $C^3$ a cup-shaped washer D, provided with an inturned annular flange $D^1$ is used. As shown thus in Figure 2, the annular flange portion $D^1$ overlies and surrounds the ends of the liners B and thus tends to hold them in place and in particular to protect their ends and to prevent jamming or wedging of the chain link between the washer D and the end of the liner. This result might otherwise occur and particularly where the outermost links of the chain have become worn.

While I have shown in Figure 2 two forms of washer, it will be understood that ordinarily whichever is used, the chain will be uniform throughout.

In the modified form shown in Figure 3, chain links E, substantially the same as the links A, are used. However, there are no liners and the compensating and wear-equalizing effect of the curved liners of the earlier forms is accomplished by the pintle pins F which are themselves curved as shown. They may be riveted over at the end as at $F^1$ or otherwise shaped to retain their position within the chain. In general, the operation of the curved pintles of Figure 3 is the same as that of the curved liners of Figures 1 and 2. As shown particularly in Figure 3, one set of links E is complete and the two pins F needed for these link sections to make of them a single composite link are in place. It will be noticed that thus in each single composite link the two pintle pins are curved outwardly at their ends with respect to the body of the composite link.

In the several forms of the invention illustrated considerable play is indicated between the chain links about either the pintles or the curved liners where they are used. It will be understood that the invention is not limited to any particular degree of play or slackness. When the chain is originally made, there will be very little and some wear will occur. In the forms shown, the amount of play is greater than usually employed. It is exaggerated to bring out the detail clearly in the drawing, but the chain might be arranged with even greater or less play, as the particular service to which it is to be applied may dictate.

The liners B have been referred to as being spring liners. It will be understood that wear develops inevitably in chains and the liner thus in effect forms an automatic compensating device to compensate for the wear and to prevent or reduce looseness. While it may not have sufficient strength to compensate for wear on the tension side of the chain, it will at least compensate for it on the non-tension side.

As originally assembled, the parts may fit so tightly that the liners will be forced flat and there will be no appreciable bowing or flexing of the liners. The initial bow given to the liners as they are made and before they are assembled in the chain will compensate for wear in the joints. The degree of bow is not necessarily that shown in Figure 2. In the actual procedure of manufacturing the chain of this invention the chain is built with no more than normal joint clearance and is assembled into position with the liners originally bowed but forced relatively flat by the assembly. They will thus be practically straight when the chain is new but as joint wear develops causing an increase in the length of the chain, and an increase in joint clearance, the liners move to the bowed position and assume more or less the position shown in Figure 2 and they thus comprise an automatic wear compensation or adjustment for the chain which is built into the chain joint itself.

Figure 5:
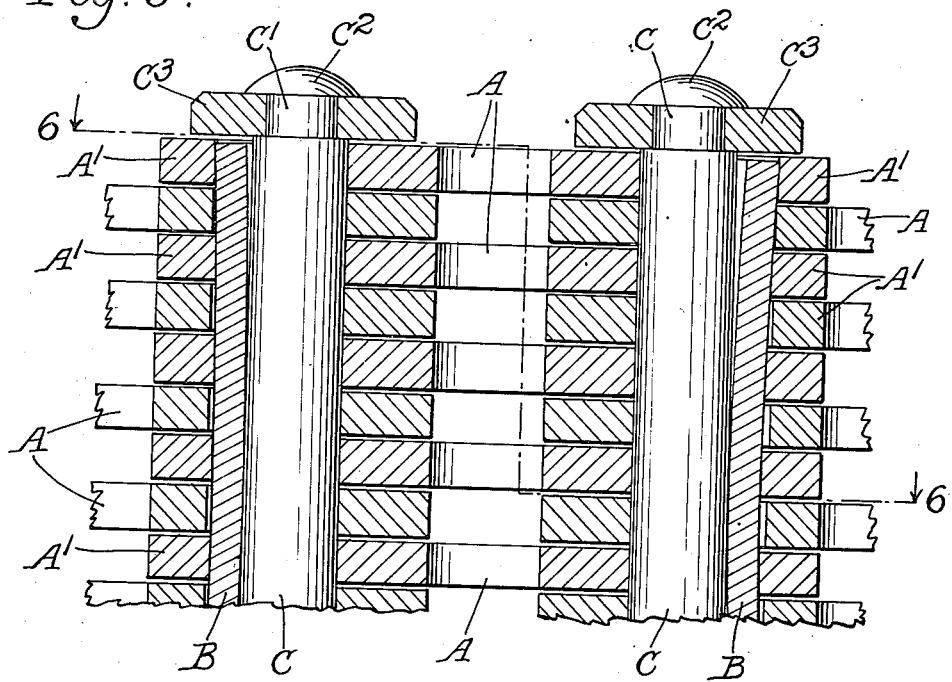
Figure 5 is a view generally similar to Figure 2, showing a modified form of chain in which for each pin there is but a single liner.

While the form of Figures 1 and 2 shows primarily the chain having two liners, it is evident that the same principle can be used with a chain joint having a pin and a single liner. This is illustrated in Figures 5 and 6; the composite chain link is similar to that shown in Figure 2, with the two flat washers $C^3$ mounted on the pins C. In this case two of the inner liners B, B are omitted. Thus there is one liner and one pin at each joint with the links of one pitch bearing directly on the pin and the links of the adjacent pitch bearing on the liner. The same effect can be gotten if either the liner or the pin is bowed or if both are bowed. It is also evident that the same principle can be applied in a chain construction having a simple pintle pin without any liners. The idea which runs through all of these forms is to use in the chain joint a part or parts originally assembled under initial tension and held more or less against deflection by the limited clearance of the parts, so that as wear increases and the clearances increase, such deflected parts will change form to compensate for this wear and increased clearance. In some cases this compensation is effective throughout the chain and in others only on the non-tension side of the chain.

As has been pointed out, an important object of the invention is to provide in the chain joints means which will compensate for elongation or increase in the length of the chain due to wear and thus so far as possible keep slack out of the chain drive. This idea runs through the various forms of the invention shown, whether they have spring liners or additional springs, as shown in Figures 7, 8, and 9, or whether they are otherwise formed.

Considering now the form shown in Figures 3 and 4, it will be seen that this form has neither liners nor added springs. The pins themselves are bowed. As initially assembled, the tension may be such that the pins are straightened but they still retain the tendency to bow when free to do so and thus retain the power to take up the slack as it develops. In this form of the invention as wear develops either in the eyes of the link or on the pin, the pin tends to return to its original slightly bowed shape, thus tending to throw the links slightly out of line at the joints and thus removing any slack which would otherwise be present. In the device of Figure 4, the pins are shown as bowed.

In the form of the invention shown in Figures 5 and 6 the chain links are as above described and as shown in Figures 1 and 2, except that since there is but a single spring liner B, the shape of the perforation or eye in the link must be modified. Thus as shown for example in Figure 6, the left hand eye of the link has a rounded portion G generally semi-cylindrical in shape and an enlarged portion $G^1$ of such size as to embrace relatively tightly the spring liner B which lies within it, while the right hand eye has a rounded portion $G^2$, which, while of partially cylindrical shape, is, as shown, preferably somewhat less than semi-cylindrical, and the enlarged portion $G^3$ is of somewhat larger size than the spring liner B which lies within it, the amount of clearance being that sufficient to permit the relative movement of the links. In this form of the chain as shown in Figure 5, the amount of wear or other looseness is such that the spring liners have resumed, partially at least, their bowed shape.

In the form of the invention shown in Figures 7 and 8 the parts are generally the same as those shown in Figures 5 and 6, except that the liners themselves may not be of spring material and an additional spring liner is inserted. This spring liner as shown in Figure 9, when uncompressed, is of larger radius than the exterior of the liner and when the chain is assembled as shown particularly in Figure 8, this added spring liner is bent into a smaller radius. In this form of the chain the spring element might be merely the added spring or it might be both the liner and the spring so that either might be made in a spring form and bowed or otherwise shaped to take up the slack as it develops. Whether the heavy liner is of spring material or not, the light liner is given a radius greater than the radius necessary in the assembled position and when it is assembled it is thus under deformation, and on the slack or non-pulling side of the chain it will tend to flatten out, thus to become undeformed and to take up any additional joint clearance or slack produced. The added thin spring is designated by the letter H. As shown in the right hand eye in Figure 8, there is a certain amount of clearance at the ends of the spring H as it lies against the liner B and within the portion G¹ of the eye.

As shown in Figure 10, there is no liner B and no added thin spring liner H and the chain is thus more nearly similar to the chain of Figures 3 and 4, except that the pin, instead of being unitary, is in fact made up of two members, contacting each other, rounded on their outer sides and inclined on their inner or contacting surfaces so that they make in effect a wedge. The pin is thus made up of two members J, J, rounded on their outer surfaces as at J¹ and each provided with an inside tapered face J². A hollow J³ is formed in each of the members J and as they lie together in the chain, as shown in Figure 10, a tension spring J⁴ lies within these hollows. The tension spring J⁴ tends to draw the two wedge faces together and so to draw each of the members inwardly and to collapse the pin upon itself, thus tending to thicken it and to crowd the pin sections as tightly as possible into the eyes and so to take up slack within the joint. Each pin may carry a washer K having an inwardly extending annular flange K¹. The washer may be fastened to the pin by a rivet K² or in any other desired manner.

It will be seen that as the pin sections are drawn together they increase the thickness or dimension $a$ indicated in Figure 11.

I claim:

1. In a chain including a plurality of associated chain links having perforations, a pintle pin upon which said links are mounted for rotation and a channel shaped liner interposed between the pin and the walls of the perforations, the liner prior to assembly being curved relative to its longitudinal axis and after initial assembly being substantially straight and under inherent stress whereby, when free to do so, it moves of itself to assume its original shape to take up wear in the chain.

2. In a chain including a plurality of associated chain links having perforations, a pintle pin upon which said links are mounted for rotation, and a channel-shaped spring liner interposed between the pin and the walls of the perforations and being under inherent stress, said liner being resilient laterally of its longitudinal axis whereby when free to do so, it moves to take up slack.

3. In a chain including a plurality of associated chain links having perforations and means providing a joint in which a plurality of said links are mounted for rotation, said joint means including a pin and a channel-shaped spring liner member interposed between said pin and links, which liner is under inherent stress at the initial assembly of the chain and which, when free to do so, moves to assume a bowed form on its longitudinal axis to take up slack within the chain.

4. In a chain including a plurality of associated chain links having perforations, means for joining together in rotational relation a plurality of such links, said means comprising a pin and a channel-shaped spring liner part interposed between the pin and the links, the liner prior to assembly being curved relative to its longitudinal axis and when assembled being substantially straight within the chain and under inherent stress, whereby when free to do so, it moves to take up slack within the chain, said spring part having greater movement at its end than at its center with respect to the pin.

5. In a chain, a plurality of associated perforated links, a rounded pin in said perforations, said pin having arcuate surfaces of rotation and a channel shaped liner in contact with said pin and interposed between it and said links, said liner being provided with an arcuate pin contacting surface, the radius of curvature of said surface before assembly being as great as the radius of curvature of the pin which it contacts, said liner when interposed between the pin and the links being under inherent stress whereby when free it will move to compensate for wear.

6. In a chain, a plurality of associated perforated links, a rounded pin in said perforations, said pin having arcuate surfaces of rotation and a pair of oppositely placed channel shaped liners in contact with said pin and interposed between it and said links, said liners being provided with an arcuate pin contacting surface, the radius of curvature of said surface before assembly being as great as the radius of curvature of the pin which it contacts, said liners when interposed between the pin and the links being under inherent stress whereby when free they will move to compensate for wear.

7. In a chain, a plurality of associated perforated links, a rounded pin in said perforations, said pin having arcuate surfaces of rotation and a channel shaped liner in contact with said pin and interposed between it and said links, said liner being provided with an arcuate pin contacting surface, the radius of curvature of said surface before assembly being as great as the radius of curvature of the pin which it contacts, said liner when interposed between the pin and the links being under inherent stress whereby when free it will move to compensate for wear, said liner being held against rotation within said perforations.

HAROLD S. PIERCE.